United States Patent Office 2,769,013
Patented Oct. 30, 1956

---

2,769,013

NEW CHEMICAL COMPOUND

Walter Lowenstein-Lom, Penarth, England, assignor to Esso Research and Engineering Company, a corporation of Delaware No Drawing. Application August 6, 1952,
Serial No. 303,011

Claims priority, application Great Britain
August 23, 1951

4 Claims. (Cl. 260—332.3)

This invention relates to new chemical compounds and to methods of their preparation. The compounds of the present invention are useful as chemical intermediates and in many cases where they are oil soluble, they are potent and stable E. P. additives for lubricating oils.

The compounds of the present invention contain both phosphorus and sulphur in their molecules. The phosphorus is present as a phosphate, phosphite, thiophosphate or thiophosphite group and sulphur is present in a heterocyclic group which is joined to the phosphate group through an oxygen or sulphur adjacent to the phosphorus atom.

Examples of heterocyclic groups that may be used according to this invention are ones containing other hetero atoms, e. g. isothiazole, thiazole and 1,2-benzisothiazene but preferred are the heterocyclic groups wherein sulphur is the only non-carbon atom. Examples of preferred heterocyclic groups are 1,2-thiapyran, 1,4-thiapyran, thianthrene, thiophene and thianaphthene. The particularly preferred heterocyclic group is the thiophene group.

Thus, the particularly preferred compounds according to this invention have the general formula:

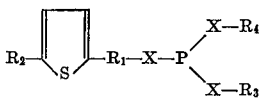

or

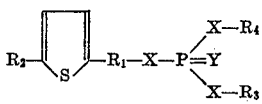

X in the above formula can represent either an oxygen or a sulphur atom. When the products are to be used as E. P. additives it is preferred that the X's are oxygen atoms. $R_1$ and $R_2$ are alkyl or aryl groups and are preferably hydrocarbon groups. $R_2$ can be hydrogen and $R_1$ can indicate a direct carbon to oxygen linkage. The groups $R_3$ and $R_4$ can be groups of the form:

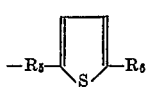

or they can be alkyl, aryl, alkaryl or aralkyl groups. Preferably they are hydrocarbon groups and particularly useful are the compounds in which $R_3$ and $R_4$ are alkyl groups containing 1 to 20 carbon atoms, especially 2 to 10 carbon atoms as, for example, propyl and butyl groups. It is also preferred that $R_2$ and $R_1$ have the same limitations as to number of carbon atoms as apply to $R_3$ and $R_4$ and particularly preferred are the compounds in which $R_1$ and $R_2$ are respectively phenylene and phenyl groups which may be substituted with hydrocarbon groups. In general it is preferred that the molecular weight should not exceed 1,000 and especially useful are materials wherein the molecular weight is less than 700.

Other compounds within the scope of this invention are ones in which the heterocyclic ring is joined to two phosphate or phosphite groups as, for example, in the compound:

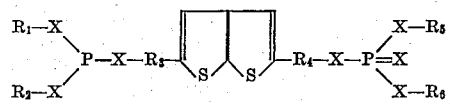

where the thiophene ring shown can be replaced by other heterocyclic sulphur containing groups but where preferably there are equal numbers of sulphur and carbon atoms in the molecule. Preparation of materials of this type must be done with care to avoid polymer formation. X and the R's have the same significance as before.

Thus, this invention in its broadest aspects comprises compounds having both phosphorus and sulphur atoms, preferably in equal number, the phosphorus atoms being directly connected only to oxygen atoms and at least one sulphur atom forming part of a heterocyclic ring which may be joined directly to an oxygen or sulphur atom attached to a phosphorus atom or may be joined to that oxygen or sulphur atom through the intermediacy of an organic, preferably hydrocarbon group.

The phosphates of the present invention may conveniently be made by reacting suitable alcohols or thio-alcohols with phosphorus trichloride in the presence of an organic base, such as pyridine, to absorb the liberated HCl. Other phosphorus compounds may be used under suitable conditions and phosphites will normally be obtained where the phosphorus compound reacted is, classically, trivalent, e. g. $P_2O_3$ and $P_2S_3$. The phosphates, also within the scope of the present invention are made by reacting classically pentavalent phosphorus compounds such as phosphorus oxychloride, phosphorus pentasulphide and phosphorus pentoxide with suitable alcohols.

Where in the required compound two non-sulphur containing groups are attached through oxygen or sulphur atoms to the phosphorus atom it is preferred to react the corresponding alcohols first and then to react the sulphur containing alcohol. Thus di-iso propyl, 2-phenyl thiophene-5,p-phenylene phosphite is preferably made by first preparing di-iso-propyl chloro-phosphite and then reacting this material with 2-phenyl,5,p-hydroxyphenyl thiophene.

The phosphate and phosphite esters of the present invention can clearly be made by a number of chemically equivalent processes, for example, by reacting suitable organic halides with phosphoric acids.

The thienyl alcohols which are starting materials in a preferred embodiment of the present invention, are conveniently made by oxidising thiophenes. Thus, 2-phenyl,5-p-hydroxyphenyl thiophene is readily made by reacting 2,5-diphenyl thiophene with potassium permanganate in alkaline solutions.

The compounds of the present invention are, when soluble in oil, effective E. P. agents therein. Furthermore, when the phosphorus atom is joined only to oxygen atoms, this improvement of the lubricating properties of the oil is not overshadowed by corresponding deterioration in other properties such as corrosion and emulsification which has generally been manifest in E. P. agents used heretofore. It is now believed that when the phosphorus atom in the compound is connected directly to one or more sulphur atoms, the structure stabilises water/oil emulsions and it is avoided in the present compounds when they are to be used when emulsification is to be avoided. Other methods of incorporating the sulphur such as sulphides, disulphides and mercaptans result in rather loosely combined sulphur and a correspondingly corrosive product. In one aspect of the present invention the sulphur is relatively firmly bound in a heterocyclic nucleus and corrosion is, therefore, only slight.

The preparation of a typical chemical compound according to this invention will now be described to exemplify the invention. 140 grams of phosphorus trichloride, 150 grams butanol, 300 grams pyridine and 500 grams carbon tetrachloride were mixed in a flask, cooled and stirred for 3 hours. To this product was added 250 grams of 2-phenyl, 5-p-hydroxyphenyl thiophene in 300 grams of carbon tetrachloride and the mixture was cooled and stirred for 3 hours. The resulting product was then water washed and dried. On distilling off the pyridine and carbon tetrachloride an odorous yellow oil resulted which comprised predominantly the compound with the formula:

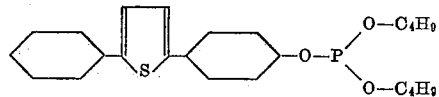

1% of the oil of this example was blended with 99%, by weight, of a phenol extracted coastal oil of turbine oil viscosity. This addition led to a raising of the failure load, as measured in the I. A. E. gear machine at 4,000 R. P. M. and using gears of E. N. 39 steel, from 35 lbs. to 75 lbs.

What I claim is:
1. A new chemical compound:

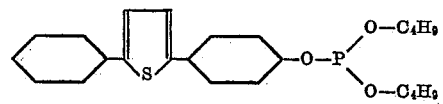

2. The process of preparing the compound of claim 1 which comprises oxidising 2,5-diphenyl thiophene with potassium permanganate in alkaline solution to form 2-phenyl,5-p-hydroxyphenyl thiophene, which is then reacted with phosphorus trichloride and butanol in the presence of pyridine and a diluent.

3. A new chemical compound having the formula

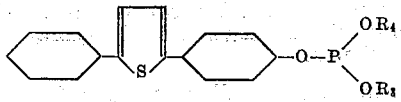

wherein $R_4$ and $R_3$ each represent alkyl groups containing 2 to 10 carbon atoms.

4. The process of preparing compounds defined by claim 3 which comprises oxidising 2,5-diphenyl thiophene with potassium permanganate in alkaline solution to form 2-phenyl,5-p-hydroxyphenyl thiophene, which is then reacted with phosphorus trichloride and $C_2$–$C_{10}$ alcohol in the presence of pyridine and a diluent.

References Cited in the file of this patent

UNITED STATES PATENTS

| | | |
|---|---|---|
| 2,624,707 | Pritzker et al. | Jan. 6, 1953 |
| 2,638,448 | Wehrle | May 12, 1953 |